US012688246B2

(12) United States Patent
Schuler et al.

(10) Patent No.: US 12,688,246 B2
(45) Date of Patent: Jul. 21, 2026

(54) APPEARANCE SEARCH FOR INCIDENT RESPONSE

(71) Applicant: MOTOROLA SOLUTIONS, INC., Chicago, IL (US)

(72) Inventors: Francesca Schuler, Palatine, IL (US); Larry D. Freeman, Valparaiso, FL (US); Christine K. Rapala, West Dundee, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/465,543

(22) Filed: Sep. 12, 2023

(65) Prior Publication Data

US 2024/0004942 A1     Jan. 4, 2024

Related U.S. Application Data

(63) Continuation of application No. 16/727,327, filed on Dec. 26, 2019, now abandoned.

(51) Int. Cl.
*G06F 16/9537*      (2019.01)
*G06F 16/9536*      (2019.01)
(Continued)

(52) U.S. Cl.
CPC ...... *G06F 16/9537* (2019.01); *G06F 16/9536* (2019.01); *G06F 16/9538* (2019.01); *G06V 20/20* (2022.01); *G06V 20/52* (2022.01)

(58) Field of Classification Search
CPC ............. G06F 16/9537; G06F 16/9536; G06F 16/9538; G06V 20/20; G06V 20/52
See application file for complete search history.

(56) References Cited

U.S. PATENT DOCUMENTS 9,389,083 B1     7/2016  Agulnik et al.
9,852,606 B1    12/2017  Heier et al.
(Continued)

FOREIGN PATENT DOCUMENTS

CA          2894648 C      8/2017

OTHER PUBLICATIONS

International Search Report and Written Opinion for Application No. PCT/US2020/063817 dated Mar. 5, 2021 (14 pages).

*Primary Examiner* — Khanh B Pham
*Assistant Examiner* — Ranjit P Doraiswamy
(74) *Attorney, Agent, or Firm* — Michael Best & Friedrich LLP

(57) ABSTRACT

Apparatus and method for appearance search for incident response. One embodiment provides a method for appearance searching for incident response. The method includes receiving a search criteria at a command server and initiating an appearance search based on the search criteria. The appearance search is performed on a plurality of responding devices communicatively connected to the command server. The method further includes receiving, at the command server, an update to the search criteria and determining, using the command server, a confidence level of the update based on weights assigned to each a plurality of parameters of the update. The method also includes creating, using the command server, an updated search criteria based on the search criteria and the update when the confidence level of the update exceeds a predetermined confidence threshold and pushing the updated search criteria for the appearance search to the plurality of responding devices.

18 Claims, 4 Drawing Sheets

(51) Int. Cl.
    *G06F 16/9538*    (2019.01)
    *G06V 20/20*    (2022.01)
    *G06V 20/52*    (2022.01)

(56) References Cited

U.S. PATENT DOCUMENTS

| | | | |
|---|---|---|---|
| 10,657,804 B2 * | 5/2020 | Giurgiu | G08G 1/0112 |
| 2010/0231714 A1 | 9/2010 | Flores et al. | |
| 2014/0169752 A1 * | 6/2014 | May | G06F 16/7867 |
| | | | 386/224 |
| 2014/0365506 A1 * | 12/2014 | Gong | G06F 16/24 |
| | | | 707/748 |
| 2016/0335070 A1 * | 11/2016 | Aw | G07C 9/00571 |
| 2017/0099200 A1 * | 4/2017 | Ellenbogen | G06V 10/764 |
| 2018/0157939 A1 | 6/2018 | Butt et al. | |
| 2019/0073520 A1 * | 3/2019 | Ayyar | G06V 40/173 |
| 2019/0156426 A1 * | 5/2019 | Drucker | G06Q 40/08 |
| 2019/0171740 A1 | 6/2019 | Sabripour et al. | |

* cited by examiner

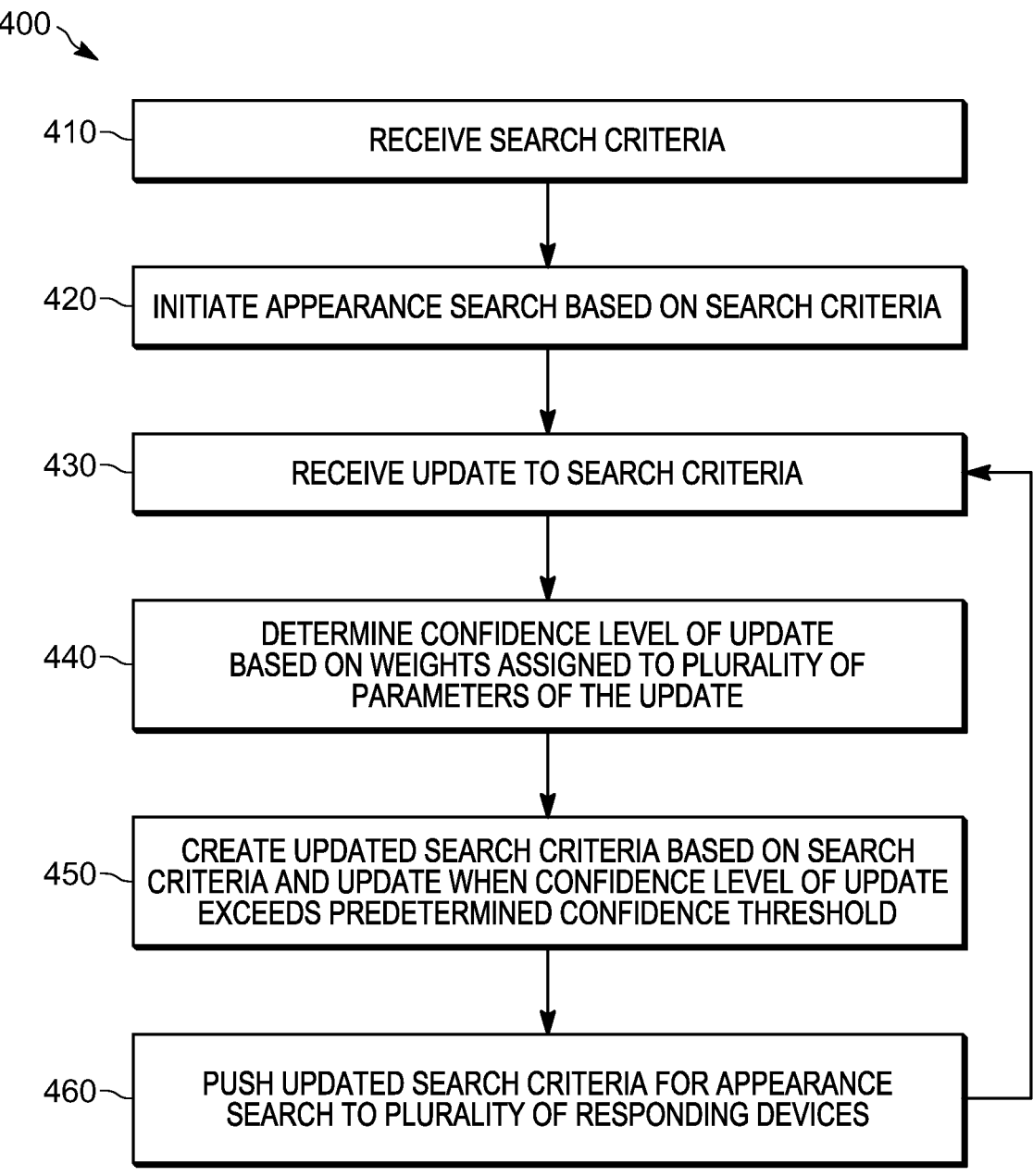

400

410 — RECEIVE SEARCH CRITERIA

420 — INITIATE APPEARANCE SEARCH BASED ON SEARCH CRITERIA

430 — RECEIVE UPDATE TO SEARCH CRITERIA

440 — DETERMINE CONFIDENCE LEVEL OF UPDATE BASED ON WEIGHTS ASSIGNED TO PLURALITY OF PARAMETERS OF THE UPDATE

450 — CREATE UPDATED SEARCH CRITERIA BASED ON SEARCH CRITERIA AND UPDATE WHEN CONFIDENCE LEVEL OF UPDATE EXCEEDS PREDETERMINED CONFIDENCE THRESHOLD

460 — PUSH UPDATED SEARCH CRITERIA FOR APPEARANCE SEARCH TO PLURALITY OF RESPONDING DEVICES

FIG. 4

| PARAMETERS OF THE UPDATE | PREDETERMINED WEIGHT | UPDATE BASED ON OBSERVATION | WEIGHT NUMBER |
|---|---|---|---|
| NUMBER OF INSTANCES OF THE UPDATE MATCH IN HISTORY | 2 | 0 | 0 |
| NUMBER OF INSTANCES OF THE UPDATE MATCH IN ACTIVE SEARCH | 3 | 0 | 0 |
| WHETHER THE UPDATE WAS DERIVED VIA DATA CAPTURE | 3 | 0 | 0 |
| WHETHER THE UPDATE WAS MANUALLY OBSERVED | 2 | 1 | 2 |
| WHETHER THE UPDATE WAS OBSERVED ACROSS MULTIPLE OFFICERS | 2 | 1 | 2 |
| WHETHER THE UPDATE WAS OBSERVED ACROSS MULTIPLE ROLE TYPES | 4 | 1 | 4 |
| TOTAL POINTS | MAX POSSIBLE: 16 | | 8 (50%) |

FIG. 5

APPEARANCE SEARCH FOR INCIDENT RESPONSE

BACKGROUND OF THE INVENTION

Appearance searches are performed with search engines at intelligence centers (for example, real time crime centers, campus security services, departments responsible for amber and/or silver alerts, and the like). As the name implies, the objective of such a search is to locate a person or object of interest across multiple databases or sources of information. In some instances, an appearance search generates a playlist including a specified vehicle or person identified across images and videos in a particular geographical area. Appearance searches are performed during post incident analysis and are generally used for evidentiary purposes.

BRIEF DESCRIPTION OF THE SEVERAL VIEWS OF THE DRAWINGS

The accompanying FIGURES, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 4 is a flowchart of a method for incident response in accordance with some embodiments.

FIG. 5 is a chart showing an example of confidence level calculation performed by the command server of FIG. 2 in accordance with some embodiments.

Figure 1:
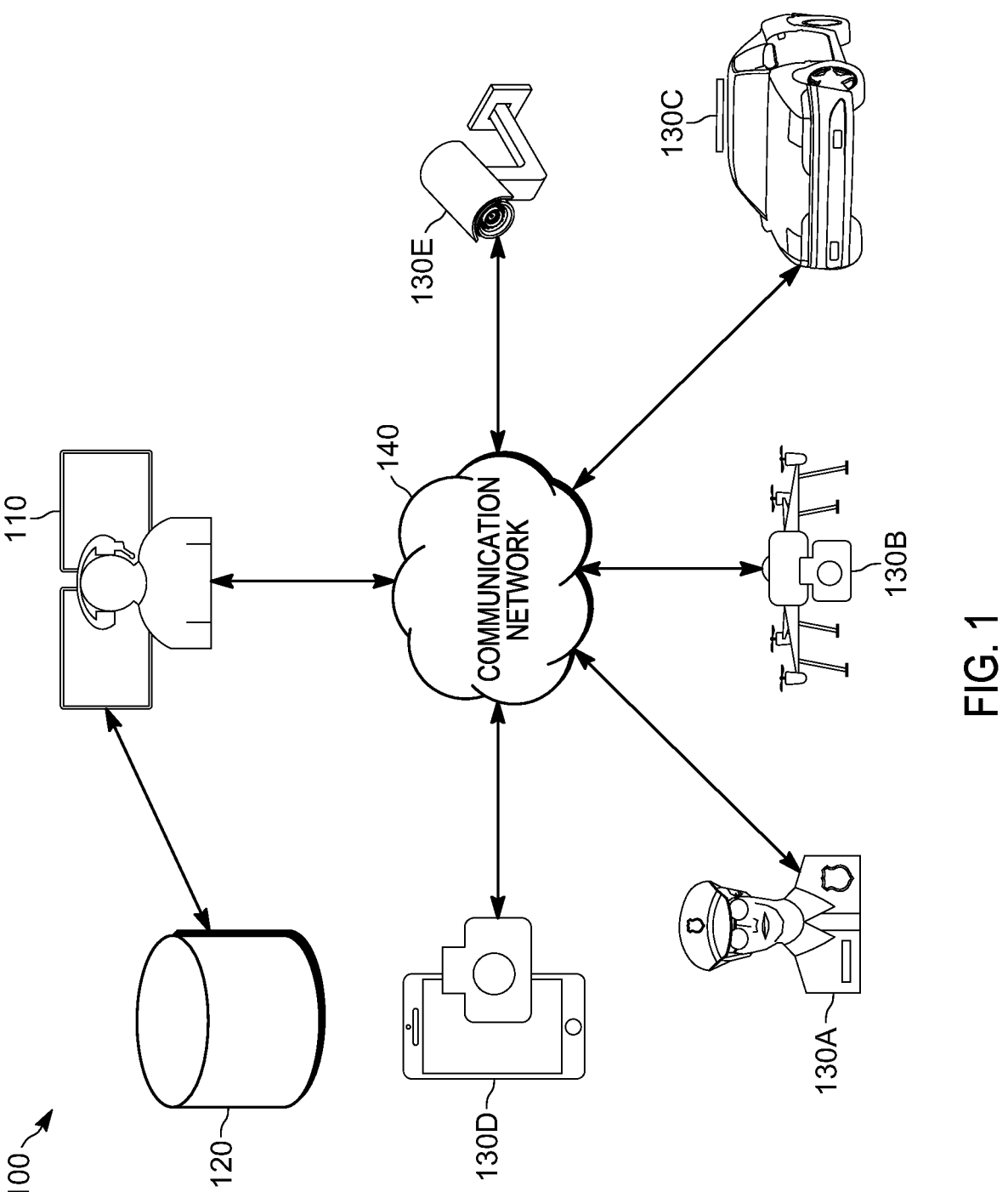
FIG. 1 is an appearance search system for incident response in accordance with some embodiments.

Skilled artisans will appreciate that elements in the FIG-URES are illustrated for simplicity and clarity and have not necessarily been drawn to scale. For example, the dimensions of some of the elements in the FIGURES may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Currently, real time appearance search is more actively being used during incident response. Search criteria for appearance search initiated at an intelligence center are used minimally during incident response by dispatchers and responders. That is, analytics for the search criteria of the appearance search are pre-provisioned and dispatched prior to or one-time during incident response. However, the search criteria for the appearance search may need to be updated during the incident response due to changing circumstances.

Accordingly, there is a need for real-time analysis, vetting, and distributing updates to search criteria received during incident response to critical roles (for example, intelligence center analysts, computer aided dispatch (CAD) dispatchers, first responders, and the like).

One embodiment provides a command server for appearance searching for incident response. The command server includes a transceiver enabling communication between the command server and a plurality of responding devices and an electronic processor coupled to the transceiver. The electronic processor is configured to receive a search criteria and initiate an appearance search based on the search criteria. The appearance search is performed on the plurality of responding devices. The electronic processor is further configured to receive an update to the search criteria and determine a confidence level of the update based on weights assigned to a plurality of parameters of the update. The electronic processor is also configured to create an updated search criteria based on the search criteria and the update when the confidence level of the update exceeds a predetermined confidence threshold and push the updated search criteria for the appearance search to the plurality of responding devices.

Another embodiment provides a method for appearance searching for incident response. The method includes receiving a search criteria at a command server and initiating, using the command server, an appearance search based on the search criteria. The appearance search is performed on a plurality of responding devices communicatively connected to the command server. The method further includes receiving, at the command server, an update to the search criteria and determining, using the command server, a confidence level of the update based on weights assigned to each a plurality of parameters of the update. The method also includes creating, using the command server, an updated search criteria based on the search criteria and the update when the confidence level of the update exceeds a predetermined confidence threshold and pushing the updated search criteria for the appearance search to the plurality of responding devices.

With reference to FIG. 1, a system 100 for appearance search for incident response includes a command server 110, data sources 120, and a plurality of responding devices 130A-E. The plurality of responding devices 130A-E communicate with the command server 110 over a communication network 140. The system 100 may include more or fewer components that those illustrated in FIG. 1 and may perform additional functions other than those described herein. The command server 110 is a computing device implemented in a cloud infrastructure or located at an intelligence center or other location. The intelligence center is, for example, a control point for coordinating an incident response (for example, a real time crime center (RTCC), a dispatch center, campus security center, and the like). The plurality of responding devices 130A-E include, for example, body worn devices of a first responder 130A (for example, a body-worn camera, a portable two-way radio, and the like), an unmanned aerial vehicle device 130B, devices in vehicles responding to an incident 130C (for example, a dashboard camera, a mobile two-way radio, and the like), smart telephones of responding officers or citizens 130D, fixed video cameras 130E (for example, closed-circuit television cameras (CCTVs), surveillance cameras, traffic cameras, and the like), and the like. The plurality of responding devices 130A-E may be singularly referred to as a responding device 130.

Figure 2:
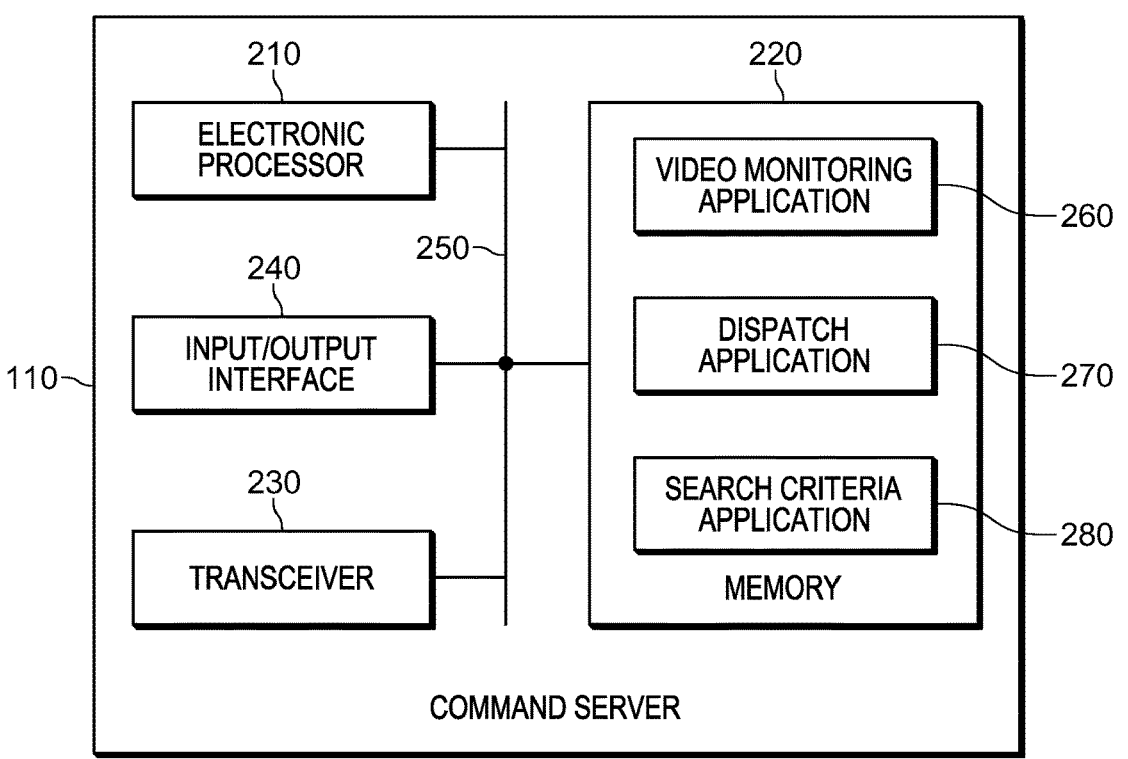
FIG. 2 is a block diagram of a command server of the system of FIG. 1 in accordance with some embodiments.

FIG. 2 is a block diagram of one embodiment of the command server 110. In the example illustrated, the command server 110 includes an electronic processor 210, a memory 220, a transceiver 230, and an input/output interface 240. The electronic processor 210, the memory 220, the transceiver 230, and the input/output interface 240 communicate over one or more control and/or data buses (for example, a communication bus 250). FIG. 2 illustrates only one example embodiment of the command server 110. The command server 110 may include more or fewer components and may perform functions other than those explicitly described herein.

In some embodiments, the electronic processor 210 is implemented as a microprocessor with separate memory, such as the memory 220. In other embodiments, the electronic processor 210 may be implemented as a microcontroller (with memory 220 on the same chip). In other embodiments, the electronic processor 210 may be implemented using multiple processors. In addition, the electronic processor 210 may be implemented partially or entirely as, for example, a field-programmable gate array (FPGA), an applications specific integrated circuit (ASIC), and the like and the memory 220 may not be needed or be modified accordingly. In the example illustrated, the memory 220 includes non-transitory, computer-readable memory that stores instructions that are received and executed by the electronic processor 210 to carry out the functionality of the command server 110 described herein. The memory 220 may include, for example, a program storage area and a data storage area. The program storage area and the data storage area may include combinations of different types of memory, such as read-only memory and random-access memory. In some embodiments, the command server 110 may include one electronic processor 210, and/or a plurality of electronic processors 210 in a cloud computer cluster arrangement, one or more of which may be executing none, all, or a portion of the applications of the command server 110 provided below, sequentially or in parallel across the one or more electronic processors 210. The one or more electronic processor 210 comprising the command server 110 may be geographically co-located or may be separated by inches, meters, kilometers or miles, and interconnected via electronic and/or optical interconnects. One or more proxy servers or load balancing server may control which one or more electronic processors 210 perform any part or all of the applications provided below.

The transceiver 230 enables wired and/or wireless communication between the command server 110 and the plurality of responding devices 130 over the communication network 160. In some embodiments, the transceiver 230 may comprise separate transmitting and receiving components. The input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

The memory 220 stores several applications that are executed by the electronic processor 210. In the example illustrated, the memory 220 includes a video monitoring application 260, a dispatch application 270, and a search criteria application 280. The video monitoring application 260 is executed to perform an appearance search to analyze image and/or video files for identifying objects or persons of interest. The objects or persons of interest are identified based on a search criteria provided to or determined by the command server 110. The video monitoring application 260 is also used to generate a synopsis or playlist based on the appearance search. The dispatch application 270 is, for example, a computer-aided dispatch application and is executed to dispatch all point bulletins (APBs), be-on-thelook-outs (BOLOs), and/or appearance searches to the plurality of responding devices 130A-E. The search criteria application 280 is executed to determine an initial search criteria for an appearance search or to update the search criteria for a current appearance search as further described below with respect to method 400.

In the example illustrated in FIG. 2, a single device is illustrated as including all the components and the applications of the command server 110. However, it should be understood that one or more of the components and one or more of the applications may be combined or divided into separate software, firmware and/or hardware. Regardless of how they are combined or divided, these components and application may be executed on the same computing device or may be distributed among different computing devices connected by one or more networks or other suitable communication means. In one example, all the components and applications of the command server 110 are implemented in a cloud infrastructure accessible through several terminal devices, with the processing power located at a server location. In another example, the components and applications of the command server 110 may be divided between separate intelligence center computing device and dispatch device co-located at an intelligence center or dispatch center of a responding organization (e.g., a police department). In yet another example, the components and applications of the command server 110 may be divided between separate computing devices not co-located with each other but communicatively connected with each other over a suitable communication network.

Figure 3:
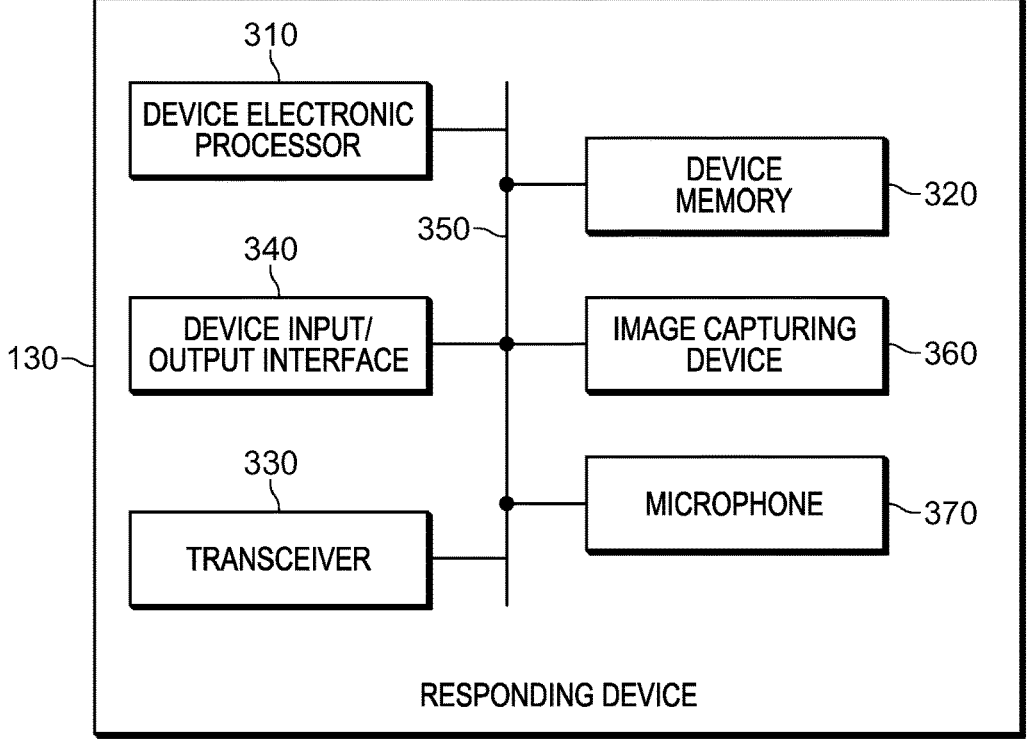
FIG. 3 is a block diagram of a responding device of the system of FIG. 1 in accordance with some embodiments.

FIG. 3 is a block diagram of one embodiment of the responding device 130. In the example illustrated, the responding device 130 includes a device electronic processor 310, a device memory 320, a device transceiver 330, and a device input/output interface 340. The device electronic processor 310, the device memory 320, the device transceiver 330, and the device input/output interface 340 communicate over one or more control and/or data buses (for example, a device communication bus 350). FIG. 3 illustrates only one example embodiment of the responding device 130. The responding device 130 may include more or fewer components and may perform functions other than those explicitly described herein.

The device electronic processor 310, the device memory 320, and the device input/output interface 340 are implemented same as or similar to the electronic processor 210, the memory 220, and the input/output interface 240. The device transceiver 330 is implemented same as or similar to the transceiver 230 and enables wired or wireless communication between the responding device 130 and the communication network 140.

The responding device 130 also includes an image capturing device 360 and a microphone 370. The image capturing device 360 and the microphone 370 are illustrated as being separate components. However, the image capturing device 360 and the microphone 370 may be part of the device input/output interface 340. In the example of a first responder, the image capturing device 360 is a body-worn camera and the microphone 370 is part of a portable two-way radio device or a smart telephone of the first responder. The body-worn camera may be communicatively coupled to the portable two-way radio, the smart telephone, or another computing device worn by the first responder. The portable two-way radio, the smart telephone, or the other computing device includes the device electronic processor 310 and the device transceiver 330 to receive the images and/or videos captured by the body-worn camera and audio captured by the microphone 370 and to transfer the images, videos, and/or speech to the command server 110 through the communication network 140. In the example of an unmanned aerial vehicle, the image capturing device 360 and the microphone 370 may be integrated into or mounted to the housing of the unmanned aerial vehicle. The image capturing device 360 and the microphone 370 capture images, audio, and/or video at an incident scene as the unmanned aerial vehicle is navigated around the incident scene. The captured, images, audio, and/or video are received and transmitted to the command server 110 through the communication network 140. In the example of a responding vehicle, the image capturing device 360 is a dashboard mounted camera and the microphone 370 is part of vehicle mounted mobile two-way radio device. The dashboard mounted camera may be communicatively coupled to the mobile two-way radio or another computing device of the responding vehicle. The mobile two-way radio or the another computing device includes the device electronic processor 310 and the device transceiver 330 to receive the images or videos captured by the dashboard mounted camera and audio captured by the microphone 370 and to transfer the images, videos, and/or speech to the command server 110 through the communication network 140.

FIG. 4 illustrates a flowchart of an example method 400 for appearance search for incident response. In the example illustrated, the method 400 includes receiving search criteria at the command server 110 (at block 410). The command server 110 monitors the data sources 120 and the plurality of responding devices 130 for data regarding an ongoing incident. The data sources 120 may include an incident report received at a terminal of the command server 110 or audio and/or video files analyzed at the intelligence center. In one example, the data sources 120 may include a report including a tip generated and input at the intelligence center by an officer. For example, the search criteria may come from a citizen calling a 911 emergency call taker and the 911 emergency call taker providing information received from the citizen into the data source 120 as a tip sheet. In another example, the search criteria may come from a specific first responder (for example, responding police officer) requesting a computer aided dispatch (CAD) dispatcher to initiate a search and the CAD dispatcher providing the information received from the first responder to the data source 120. In some embodiments, an intelligence center analyst may also refer to a tip database that is part of the data sources 120 for initiating or updating the search criteria. Based on the several data sources, a search criteria for an appearance search may be generated and/or input to the command server 110. The appearance search generally includes a subject that is, for example, a person, a vehicle, an object, and the like (that is, an object of interest). The search criteria defines the characteristics of the subject of the appearance search such that the devices performing the appearance search can identify subjects having the characteristics in images or videos. That is, the appearance search includes a responding device 130 of the plurality of responding devices 130 determining whether an image and/or video captured by the responding device 130 includes an object of interest that is the subject of the appearance search based on the search criteria.

In one example, an intelligence center analyst monitoring live video detects an incident occurring involving a vehicle. The vehicle moves out of the view of a camera being monitored by the analyst. The intelligence center analyst may not be sure whether the vehicle is still in the area. The analyst may then input a request for an appearance search with the command server 110. The analyst may provide a description or characteristics of the vehicle (for example, make, model, year, color, license plate number, and the like) as the search criteria. This search criteria is received by the command server 110 for the appearance search.

The method 400 also includes initiating, using the command server 110, an appearance search based on the search criteria (at block 420). The appearance search is performed on the plurality of responding devices 130 communicatively connected to the command server 110. The command server 110 issues an appearance search based on the search criteria received for an incident. The command server 110 dispatches the search criteria to the various responding devices 130 responding to the incident. The responding devices 130 receive the search criteria and perform the appearance search based on the search criteria. In one example, the image and video files are analyzed at the responding device 130 based on the search criteria to perform the appearance search. In another embodiment, the image and video files are transmitted from the responding device 130 to another computing device (for example, the command server 110), which in turn performs the appearance search on the video files. In yet another example, the appearance search may be partially conducted on the responding device 130 and partially on the command server 110 using the video monitoring application 260.

Continuing the above example of a vehicle incident, the command server 110 initiates an appearance search for the missing vehicle based on the search criteria received for the missing vehicle. The search criteria is dispatched to the responding devices 130 that may include responding vehicles and officers in the area or an unmanned aerial vehicle deployed for the incident. The responding devices 130 use the search criteria to identify the vehicle and transmit an indication to the command server 110 if the vehicle is identified by a responding device 130. The responding device 130 may also transmit the image or a portion of a captured video including the identified vehicle to the command server 110.

The method 400 includes receiving, at the command server 110, an update to the search criteria (at block 430). When new information is discovered regarding the current incident, the search criteria may have to be updated to accurately perform the appearance search. The updated search criteria may be received same or similarly as the original search criteria. For example, information may be provided to the data sources 120 based on a tip call from a citizen to a 911 emergency call taker or from a responding officer to a CAD dispatcher. The new information may be discovered based on a historical appearance search or during the active appearance search. For example, an analyst looking at a video sample of the appearance search may notice a change to the search criteria (for example, a suspect changed clothes, a suspect changed license plates on a vehicle, and the like). In addition, the new information may also be discovered by an officer responding to the incident. The officer may provide the new information via audio through the responding officer's microphone 370 or via text through the officer two-way radio or smart telephone. The new information may automatically trigger an update to the search criteria at the command server 110. For example, the new information is received as an update to the search criteria at the command server 110. In some embodiments, the command server 110 automatically initiates the update in response to analyzing data from a plurality of data sources. For example, the command server 110 analyzes new tips received from the data sources 120, analyzes other audio, video, and/or image sources to determine new information or changed circumstances and automatically initiates the update based on the new information or changed circumstances.

The method 400 includes determining, using the command server 110, a confidence level of the update based on weights assigned to each a plurality of parameters of the update (at block 440). Although new information may be discovered regarding an incident, all new information may not trigger an update to the search criteria. The command server 110 vets the update to the search criteria to determine whether pushing the update to the plurality of responding devices 130 is warranted based on the update. The update includes plurality of parameters that are weighted by the intelligence center.

The plurality of parameters include, for example, a number of instances of the update match in history, a number of instances of the update match in active search, whether the update was derived via data capture, whether the update was manually observed by a role (for example, a responding officer), whether the update was observed across multiple of a single role type (for example, witnessed by multiple responding officers, captured on multiple dashboard mounted cameras, or the like), and whether the update was observed across multiple role types (for example, both witnessed by a responding officer, and observed on a dashboard mounted camera). Examples of different role types include an intelligence center analyst, a computer aided dispatch (CAD) dispatcher, a 911 emergency call taker, emergency responders including emergency medical technicians (EMTs), police officer, and firefighters, and the like. Another example of an update being observed across multiple role types includes an intelligence center analyst witnessing an update using a dashboard camera of a responding vehicle and confirming the update to the command server 110 in addition to a responding police officer manually observing the update and confirming the update to the command server 110. Each of the plurality of parameters may be assigned a certain weight by the command server 110. These weights may be pre-stored. In one example as shown in FIG. 5, the weights are integers. In other examples, the weights include, but not limited to, percentages, decimals, and the like. The command server 110 determines a calculated weight number for each parameter based on whether the update satisfies the parameter or the amount to which the update satisfied the parameter. The command server 110 adds the calculated weight numbers to determine the confidence level of the update. For example, the calculated weight number may be determined using, but not limited to, summation, multiplication, division, and/or other mathematical combinational process to determine a confidence level. The threshold confidence level varies based on the form factor (for example, integers, percentages, decimals, and the like) used for the weights. For example, the threshold confidence level may be a threshold integer, a threshold percentage, a threshold decimal or the like. In some embodiments, the threshold confidence level may include multiple threshold confidence levels. For example, the threshold confidence level may include a 80% threshold and a 50% threshold. When the confidence level is above the 80% threshold, the update to the appearance search may be automatically applied and/or executed. When the confidence level is between 50% and 80%, the update may not be automatically applied and/or executed and an intelligence center analyst may be prompted to update the appearance search. When the confidence level is below 50%, the update may be automatically discarded and/or saved/shelved for future consideration.

FIG. 5 illustrates one example chart 500 for determining a confidence level of an update. In the example illustrated, the command server 110 determines the confidence level of an update requested by a responding officer based on an observation by multiple responding officer. The responding officer may provide the new information to the command server 110 (for example, by using an application on the two-way radio or smart telephone communicating with the command server 110), which may automatically trigger the update based on the new information. In some embodiments, the responding office may not specifically request an update, but may provide a report of an observation. The report may turn into a request for an update or may trigger the update when the calculated weight number reaches the threshold confidence level. The chart 500 includes a first column showing the plurality of parameters, a second column showing predetermined parameter weights assigned to the plurality of parameters, a third column showing whether and/or the amount to which the update satisfies a parameter, and a fourth column showing the calculated weight number for the update for the plurality of parameters. Since the update was based on manual observation by a responding officer, the command server 110 assigns zero calculated weight numbers for the parameters: (i) number of instances of update match in history; (ii) number of instances of update match in active search; and (iii) whether the update was derived via data capture. The command server 110 assigns weight numbers of 2, 2, and 4 respectively based on the update being manually observed, observed by multiple responding officers, and observed by responding officers with different roles. The command server 110 adds the calculated weight numbers to determine that the confidence level is 8 or 50% of the maximum of 16.

The method 400 includes creating, using the command server 110, an updated search criteria based on the search criteria and the update when the confidence level of the update exceeds a predetermined confidence threshold (at block 450). The predetermined confidence threshold may be preset into the command server 110. For example, a different predetermined confidence threshold may be stored in correspondence with different types of incidents. In some embodiments, the predetermined confidence threshold may be programmatically calculated based on predetermined criteria (for example, incident type, incident location, and the like) stored in the command server 110. In one example, the predetermined confidence threshold may be lower for an amber alert and higher for a prisoner escape incident. When the command server 110 determines that the confidence level meets or exceeds the predetermined confidence level, the command server 110 generates the updated search criteria based on the original search criteria and the update. For example, when a suspect changes a license plate of a vehicle, the update may include removing the previous license plate number and adding the new license plate number. The updated search criteria may include the previous search criteria with the license plate number updated to the new license plate number. Accordingly, the update may include one or more of an amendment, a deletion, and an addition of a characteristic provided in the original or previously updated search criteria. When the command server 110 determines that the confidence level does not meet or exceed the predetermined confidence level, the command server 110 may discard the update and does not create the updated search criteria, or may cause a prompt to be provided to a dispatcher or other person in the manner already set forth above. In some embodiments, the command server 110 saves the update for future implementation when the confidence level does not meet or exceed the predetermined confidence level. The saved or shelved update may be used as a parameter to weigh the confidence level of a future update as described above. For example, if a similar update to the search criteria is received in the future, the future update may result in a higher confidence level based the saved or shelved update. The appearance search is conducted based on the original search criteria or a previously updated search criteria when the confidence level of the current update does not meet or exceed the predetermined confidence level.

The method 400 also includes pushing the updated search criteria for the appearance search to the plurality of responding devices 130 (at block 460). The command server 110 executes the dispatch application 270 to push the updated search criteria to the plurality of responding device 130. The plurality of responding devices 130 now conduct the appearance search based on the updated search criteria and may disregard the original search criteria. In some embodiments, the command server 110 receives, via the transceiver 230, an acknowledgement from the plurality of responding devices 130 in response to the plurality of responding devices 130 receiving the updated search criteria. The method 400 repeats for any additional update received to the search criteria.

In some embodiments, the command server 110 generates a historic report for the appearance search. The command server 110 stores the initial search criteria and every update received for the search criteria. The updates may be stored with the time at which the update was received and the reason for receiving the update to the search criteria. For example, the command server 110 stores whether the update was received based on a tip from a citizen to a 911 emergency call taker or from a responding police officer informing a CAD dispatcher. The command server 110 may also store whether the update was implemented, discarded, or saved for future implementation. Additionally, the command server 110 may store the confidence level including the weights received based on each parameter for the update to the search criteria. The historic report generated by the command server may include the timestamp for each update to the search criteria and the reason for receiving the update to the search criteria. The historic report may also include the weights for each parameter for each of the updates and the confidence level for each of the updates.

Manual feedback of when an update should have been triggered but was not, or when an update was triggered but should not have been, may be fed into a machine learning program, along with the parameters, weights, and threshold levels set forth above, to create a trained model for updating appearance searches in the future, among other possibilities.

In the foregoing specification, specific embodiments have been described. However, one of ordinary skill in the art appreciates that various modifications and changes can be made without departing from the scope of the invention as set forth in the claims below. Accordingly, the specification and FIGURES are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A command server for appearance searching for incident response, the command server comprising:

a transceiver; and an electronic processor coupled to the transceiver and configured to:

communicate with a plurality of responding electronic devices over a communication network via the transceiver, receive a search criteria via the transceiver from at least one responding electronic device from the plurality of responding electronic devices, initiate an appearance search based on the search criteria by dispatching, via the transceiver, the search criteria to the plurality of responding electronic devices, wherein the appearance search is performed on the plurality of responding electronic devices, wherein the appearance search includes a responding electronic device of the plurality of responding electronic devices determining whether a digital video captured by the responding electronic device includes an object of interest that is a subject of the appearance search based on the search criteria, receive an update to the search criteria via the transceiver from at least one responding electronic device from the plurality of responding electronic devices, determine a confidence level of the update based on weights assigned to a plurality of parameters of the update, wherein the plurality of parameters include a source of the update and a number of instances of the update and wherein different weights are given to the source of the update and the number of instances of the update, in response to determining that the confidence level is greater than a first predetermined threshold value, create an updated search criteria for the appearance search based on the search criteria and the update and automatically push the updated search criteria for the appearance search to the plurality of responding electronic devices via the transceiver, in response to determining that the confidence level falls between the first predetermined threshold value and a second predetermined threshold value that is less than the first predetermined threshold value, generate a prompt to an intelligence center to update the appearance search, and in response to determining that the confidence level is less than the second predetermined threshold value, automatically save the update for future implementation.

2. The command server of claim 1, wherein the update includes one or more of: an amendment, a deletion, and an addition of a characteristic provided in the search criteria.

3. The command server of claim 1, wherein the electronic processor is further configured to assign the saved update a first weight and determine the confidence of the update further based on the first weight of the saved update.

4. The command server of claim 1, wherein the electronic processor is further configured to automatically initiate the update in response to analyzing data from a plurality of data sources.

5. The command server of claim 1, wherein the electronic processor is further configured to receive, via the transceiver, an acknowledgement from the plurality of responding electronic devices in response to the plurality of responding electronic devices receiving the updated search criteria; and receive, via the transceiver, an indication when a subject of the updated search criteria is identified in a digital video by a responding electronic device of the plurality of responding electronic device, wherein the indication is separate from the acknowledgement.

6. The command server of claim 1, wherein the electronic processor is further configured to generate a historic report of the appearance search, the historic report including the search criteria and each update to the search criteria considered for the appearance search for a duration of the incident.

7. The command server of claim 6, wherein the historic report further includes a timestamp for each update to the search criteria and a reason for receiving the update to the search criteria.

8. A method for appearance searching for incident response, the method comprising:

receiving, via a transceiver, a search criteria at a command server from a plurality of responding electronic devices;

initiating, using the command server, an appearance search based on the search criteria by dispatching, via the transceiver, the search criteria to the plurality of responding electronic devices, wherein the appearance search is performed on a plurality of responding electronic devices, wherein the appearance search includes a responding electronic device of the plurality of responding electronic devices determining whether a digital video captured by the responding electronic device includes an object of interest that is a subject of the appearance search based on the search criteria;

receiving, at the command server, an update to the search criteria via the transceiver from at least one responding electronic device from the plurality of responding electronic devices;

determining, using the command server, a confidence level of the update based on weights assigned to each a plurality of parameters of the update, wherein the plurality of parameters include a source of the update and a number of instances of the update and wherein different weights are given to the source of the update and the number of instances of the update;

in response to determining that the confidence level is greater than a first predetermined threshold value, creating, using the command server, an updated search criteria for the appearance search based on the search criteria and the update and automatically pushing the updated search criteria for the appearance search to the plurality of responding electronic devices via the transceiver;

in response to determining that the confidence level falls between the first predetermined threshold value and a second predetermined threshold value that is less than the first predetermined threshold value, generating a prompt to an intelligence center analyst to update the appearance search; and in response to determining that the confidence level is less than the second predetermined threshold value, automatically saving the update for future implementation.

9. The method of claim 8, wherein the update includes one or more of: an amendment; a deletion, and an addition of a characteristic provided in the search criteria.

10. The method of claim 8, further comprising assigning the saved update a first weight and determining the confidence of the update further based on the first weight of the saved update.

11. The method of claim 8, further comprising automatically initiating the update in response to analyzing data from a plurality of data sources.

12. The method of claim 8, further comprising receiving, at the command server, an acknowledgement from the plurality of responding electronic devices in response to the plurality of responding electronic devices receiving the updated search criteria; and receiving, via the transceiver, an indication when a subject of the updated search criteria is identified in a digital video by a responding electronic device of the plurality of responding electronic device, wherein the indication is separate from the acknowledgement.

13. The method of claim 8, further comprising generating a historic report of the appearance search, the historic report including the search criteria and each update to the search criteria considered for the appearance search for a duration of the incident.

14. The method of claim 13, wherein the historic report further includes a timestamp for each update to the search criteria and a reason for receiving the update to the search criteria.

15. The command server of claim 1, wherein the electronic processor is further configured to conduct the appearance search based on the search criteria of the appearance search using instructions stored in a memory of the command server in addition to the plurality of responding electronic devices performing the appearance search.

16. The command server of claim 1, wherein the electronic processor is further configured to use the update saved for future implementation as a parameter to weigh a confidence level of a future update.

17. The command server of claim 1, wherein the source of the update is at least one from a group consisting of an incident report, an audio file, a digital video file, and a tip stored in a tip database.

18. The command server of claim 1, wherein the number of instances of the update is determined by the electronic processor based on a number of responding electronic devices that observe the update.

* * * * *